United States Patent
Linden et al.

(10) Patent No.: US 10,793,107 B2
(45) Date of Patent: Oct. 6, 2020

(54) VEHICLE DOOR ACTIVATION DEVICE

(71) Applicant: Ford Global Technologies, LLC, Dearborn, MI (US)

(72) Inventors: Howard Paul Tsvi Linden, Southfield, MI (US); Onoyom Essien Ekanem, White Lake, MI (US); David Wooten, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 218 days.

(21) Appl. No.: 16/118,011

(22) Filed: Aug. 30, 2018

(65) Prior Publication Data

US 2020/0070775 A1   Mar. 5, 2020

(51) Int. Cl.

| E05F 15/00 | (2015.01) |
|---|---|
| B60R 25/24 | (2013.01) |
| B60R 16/033 | (2006.01) |
| E05B 81/78 | (2014.01) |
| E05B 81/82 | (2014.01) |
| B60Q 1/50 | (2006.01) |

(52) U.S. Cl.
CPC ............... *B60R 25/24* (2013.01); *B60Q 1/50* (2013.01); *B60R 16/033* (2013.01); *E05B 81/78* (2013.01); *E05B 81/82* (2013.01)

(58) Field of Classification Search
CPC ....... B60R 16/033; B60R 25/40; B60R 25/30; B60R 25/25; B60R 25/403; B60R 25/406; E05B 81/78; E05B 81/82; B60Q 1/50; G07C 9/00896; G07C 2209/08; G07C 2009/0042; G07C 2009/00769; G07C 9/00309

USPC .................... 49/31; 307/10.1, 10.7
See application file for complete search history.

(56) References Cited

U.S. PATENT DOCUMENTS

| 6,621,178 | B2 * | 9/2003 | Morillon ............... B60R 25/245 |
| | | | 307/10.1 |
| 8,594,616 | B2 * | 11/2013 | Gusikhin ................ H04W 4/90 |
| | | | 455/404.1 |
| 9,807,570 | B1 | 10/2017 | Lazarini et al. |
| 9,922,472 | B2 | 3/2018 | Jergess et al. |
| 9,988,014 | B2 * | 6/2018 | Parasurama ........ B60R 25/1003 |
| 2010/0231349 | A1 * | 9/2010 | Tanaka .................... B60R 25/24 |
| | | | 340/5.2 |
| 2013/0076484 | A1 * | 3/2013 | Nishiguchi .......... H01Q 1/3241 |
| | | | 340/5.64 |
| 2015/0001926 | A1 | 1/2015 | Kageyama et al. |
| 2017/0247016 | A1 | 8/2017 | Krishnan |
| 2019/0066422 | A1 * | 2/2019 | Breer .................. G07C 9/00309 |
| 2019/0299756 | A1 * | 10/2019 | Asher .................... B60J 5/0416 |
| 2020/0047715 | A1 * | 2/2020 | Park ................... G07C 9/00309 |

\* cited by examiner

*Primary Examiner* — Chi Q Nguyen
(74) *Attorney, Agent, or Firm* — Frank Lollo; Eversheds Sutherland (US) LLP

(57) ABSTRACT

A vehicle door activation device includes a housing, an activation button connected with the housing to define a first chamber and a second chamber, a back-up battery stored in the first chamber, and a semiconductor chip stored in the second chamber. The semiconductor chip, in response to a voltage supplied to a vehicle door being less than a threshold, causes the back-up battery to supply power to the vehicle door, and, in response to a tag being within a proximity from the semiconductor chip and an actuation of the activation button, causes the vehicle door to unlock.

20 Claims, 4 Drawing Sheets

VEHICLE DOOR ACTIVATION DEVICE

TECHNICAL FIELD

The present disclosure generally relates to a vehicle door activation device and, more specifically, a vehicle door activation device for controlling access to a vehicle cabin.

BACKGROUND

Vehicles include a passive entry system for automatically unlocking and opening vehicle doors without using mechanical keys. Since accesses to a vehicle cabin are granted to a user with minimal to no interaction with the vehicle door, conventional vehicle door handles and keyholes are gradually becoming obsolete.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Apparatus and methods for controlling access to a vehicle cabin are disclosed. An example vehicle includes a vehicle door. The vehicle door includes a switch, a back-up battery, antennas, and one or more processors configured to: responsive to a voltage supplied to the vehicle door being less than a threshold: cause the back-up battery to supply power to the vehicle door, and responsive to a tag being within a proximity from the antennas and an actuation of the switch, cause the vehicle door to unlock.

An example vehicle door activation device includes a housing, an activation button connected with the housing to define a first chamber and a second chamber, a back-up battery stored in the first chamber; and a semiconductor chip stored in the second chamber, the semiconductor chip configured to: responsive to a voltage supplied to a vehicle door being less than a threshold: cause the back-up battery to supply power to the vehicle door; and responsive to a tag being within a proximity from the semiconductor chip and an actuation of the activation button, cause the vehicle door to unlock.

An example method includes responsive to a voltage supplied to a vehicle door being less than a threshold: causing a back-up battery within the vehicle door to supply power to the vehicle door, and responsive to a tag being within a proximity from antennas included in the vehicle door and an actuation of a switch included in the vehicle door, causing the vehicle door to unlock.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
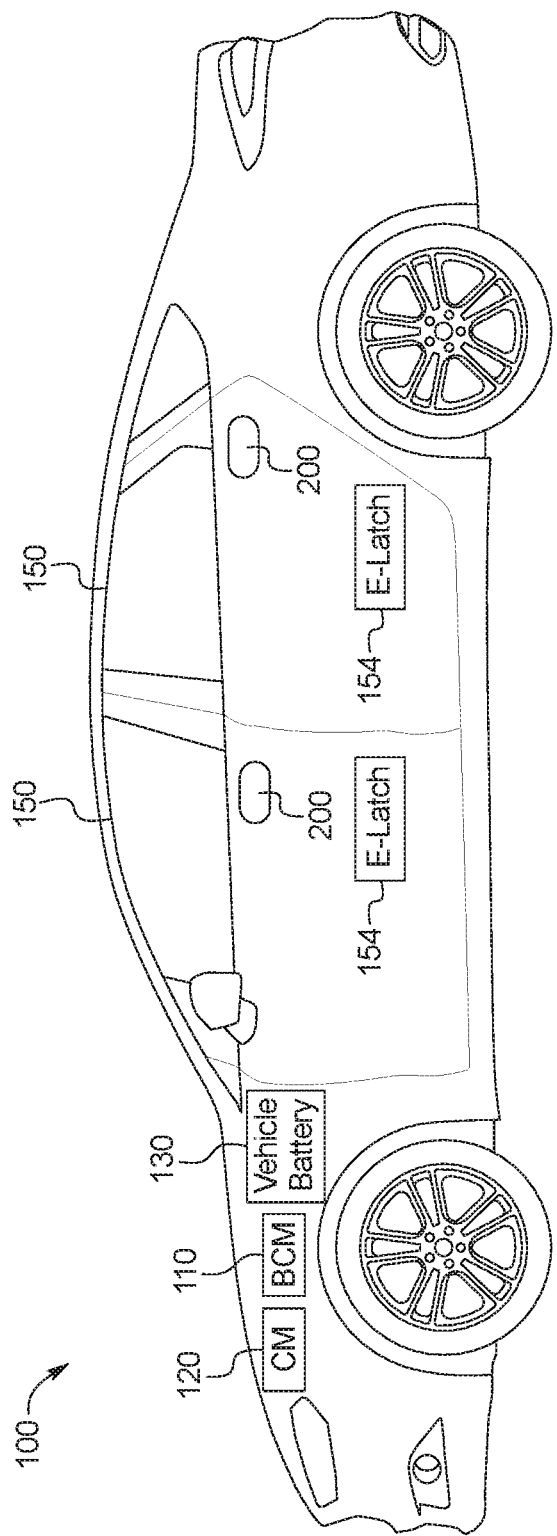
FIG. 1 illustrates a vehicle operating in accordance with this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Conventional vehicles include handles and keyholes installed on the exterior surface of vehicle doors for unlocking and unlatching the vehicle door. Typically, mechanical keys are utilized to unlock these vehicle doors. For instance, a mechanical key is inserted into a keyhole and rotated to unlock a vehicle. Further, a vehicle door handle is actuated by a user to unlatch the vehicle door from the vehicle.

Recently, vehicles have implemented a passive entry system for unlocking vehicle doors without using mechanical keys. For instance, remote devices, such as key fobs or mobile devices functioning as a key, i.e., phone-as-a-key (Paak), have been utilized to unlock vehicle doors. For instance, remote devices wirelessly communicate with vehicles to initiate unlocking of vehicle doors. In some instances, a passive-entry system automatically unlocks a door in response to detecting a remote device within a proximity from a vehicle and authenticating the remote device. In some such instances, the passive-entry system further unlatches the vehicle door and automatically opens the vehicle door up to a predetermined degree. Such features render conventional vehicle door handles and keyholes obsolete.

Example methods and apparatus disclosed herein simplifies the interface of a vehicle door by replacing conventional vehicle door handles and keyholes with a vehicle door activation device. The vehicle door activation device operates with a vehicle passive entry system to unlock the vehicle door in response to detecting a remote device within a proximity from the vehicle and authenticating the remote device. The vehicle door activation device unlatches the vehicle door from the body of the vehicle in response to a first actuation of a button included in the vehicle door activation device. The vehicle door activation device locks the vehicle door in response to a second different actuation of the switch. The vehicle door activation device includes a back-up power system for detecting and authenticating the remote device and unlocking and unlatching the vehicle door when a power supplied to the vehicle door from a vehicle power source is less than a threshold.

As used herein, "passive entry" and "passive-entry" refer to a system of a vehicle that unlock(s) one or more doors of the vehicle upon detecting and authenticating a remote device.

As used herein, a "remote device" refer to an electronic mobile device (e.g., a key fob, a smart phone, a wearable, a smart watch, a tablet, etc.) that wirelessly communicates with a vehicle to unlock and/or lock one or more doors of the vehicle.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle), or autonomous (e.g., motive functions are controlled by the vehicle without direct driver input). In the illustrated example, the vehicle 100 includes a body control module 110 (also referred to as a BCM), a communication module 120, a vehicle battery 130, and doors 150.

The body control module 110 of the illustrated example is an electronic control unit (ECU) of the vehicle. ECUs monitor and control the subsystems of the vehicle 100. For example, the ECUs are discrete sets of electronics that include their own circuit(s) (e.g., integrated circuits, microprocessors, memory, storage, etc.) and firmware, sensors, actuators, and/or mounting hardware. The ECUs communicate and exchange information (e.g., via a vehicle data bus). Additionally, the ECUs may communicate properties (e.g., status of the ECUs, sensor readings, control state, error and diagnostic codes, etc.) to and/or receive requests from each other. For example, the vehicle may include dozens of ECUs that are positioned in various locations around the vehicle. The body control module 110 controls one or more subsystems throughout the vehicle, such as a vehicle door plunger, a vehicle door motor, power windows, an immobilizer system, power mirrors, etc. For example, the body control module 110 includes circuits that drive one or more of relays (e.g., to control wiper fluid, etc.), brushed direct current (DC) motors (e.g., to control power seats, power windows, wipers, etc.), stepper motors, LEDs, etc.

The communication module 120 of the illustrated example includes wired or wireless network interface(s) that enable communication with remote devices, an external server, other vehicles, etc. The communication module 120 includes hardware (e.g., processors, memory, storage, antenna, etc.) and software to control the wired or wireless network interface(s). In some examples, the communication module 120 includes a wireless personal area network (WPAN) module that is configured to wirelessly communicate with nearby device(s) via short-range wireless communication protocol(s). For example, the communication module 120 includes antenna(s) to wirelessly communicate via the Bluetooth® and/or Bluetooth® Low Energy (BLE) protocols. Additionally or alternatively, the communication module 120 includes antenna(s) to wirelessly communicate via Wi-Fi®, low frequency (LF) communication, Near Field Communication (NFC), Radio-Frequency Identification (RFID), ultra-wide band (UWB) communication, ultra-high frequency (UHF) communication, and/or any other wireless communication protocol. Additionally or alternatively, the communication module 120 includes wired or wireless network interface(s) that enable communication with external networks. For example, the communication module 120 is configured to wirelessly communicate with a nearby device via an external network. The external network(s) may be a public network, such as the Internet; a private network, such as an intranet; or combinations thereof, and may utilize a variety of networking protocols now available or later developed including, but not limited to, TCP/IP-based networking protocols. For example, the communication module 120 includes one or more communication controllers for cellular networks, such as Global System for Mobile Communications (GSM), Universal Mobile Telecommunications System (UMTS), Long Term Evolution (LTE), Code Division Multiple Access (CDMA). In the illustrated example, the communication module 120 is communicatively coupled to the e-latch 154 and the vehicle door activation device 200 of each of the doors 150 to facilitate operation of a passive-entry system of the vehicle. In such example, the communication module 120 registers one or more remote devices functioning as a Paak.

The vehicle battery 130 is a rechargeable battery for supplying power to various electrical components within the vehicle. The vehicle battery 130 is recharged via a vehicle alternator (not illustrated). In some examples, the vehicle battery 130 may be a 12 volt battery.

Each of the doors 150 enable a user to access a cabin of the vehicle. In the illustrated example, each of the doors 150 includes an electronic latch (e-latch) 154 and a vehicle door activation device 200. In some examples, less than all of the doors 150 may include the e-latch 154 the vehicle door activation device 200.

The e-latch 154 is an electromechanical device that enables a vehicle to be locked and unlocked to prevent and provide to the vehicle cabin. The e-latch 154 includes a mechanical latch (not illustrated) that is configured to lock and/or unlock the door. Further, the e-latch 154 includes a motor (not illustrated) to drive the latch between a locked position and an unlocked position. The e-latch 154 further includes a memory and a processor (not illustrated) for communicating with the vehicle door activation device 200, the body control module 110, the communication module 120, and other ECUs included in the vehicle.

Figure 2A:
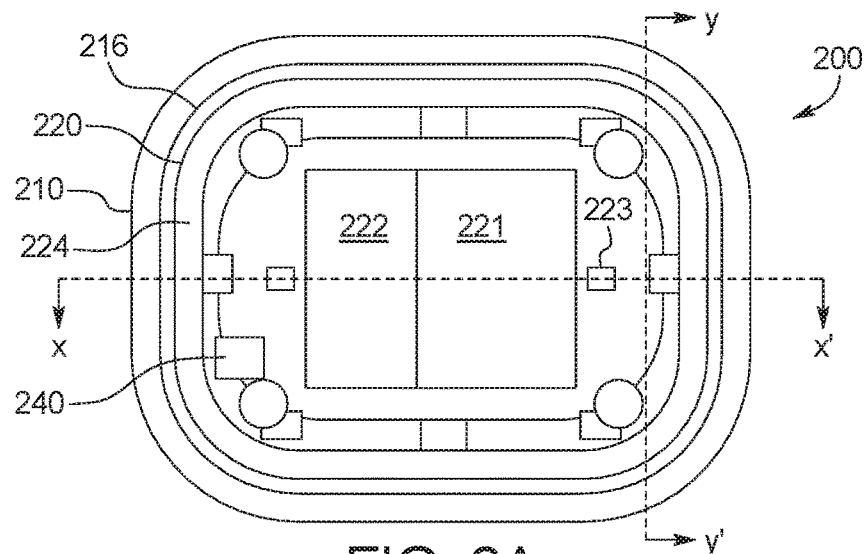
FIG. 2A illustrates a plan view of a vehicle door activation device of the vehicle of FIG. 1 without an activation button.
Figure 2B:
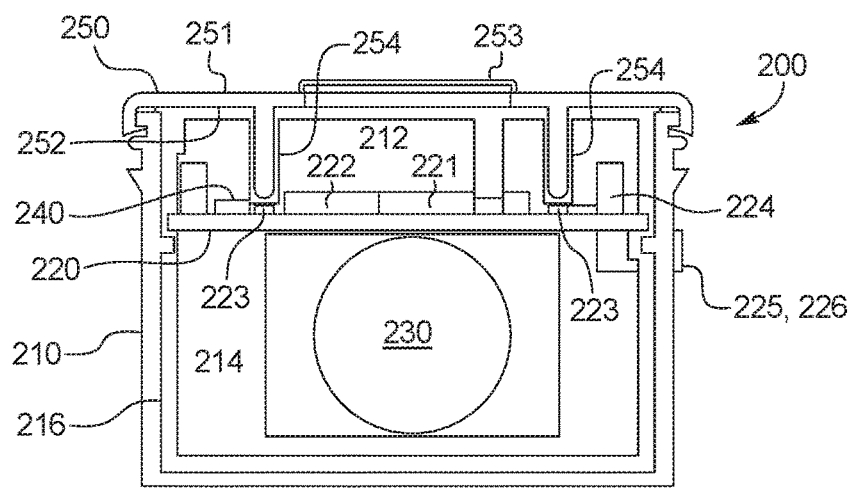
FIG. 2B illustrates a cross-sectional view of the vehicle door activation device of the vehicle of FIG. 1 along the x-x' direction.
Figure 2C:
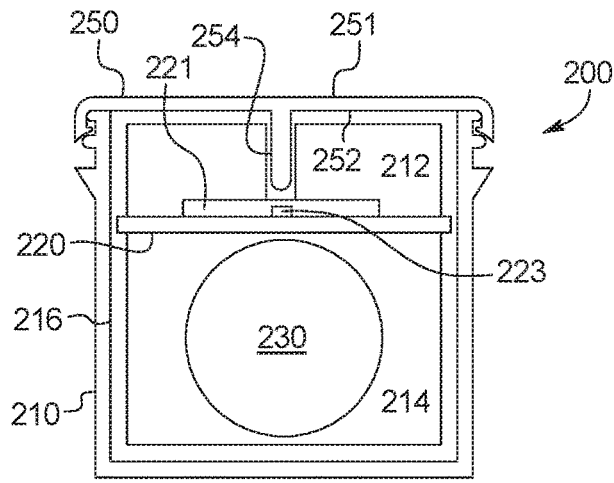
FIG. 2C illustrates a cross-sectional view of the vehicle door activation device of the vehicle of FIG. 1 along the y-y' direction.

FIG. 2A-2C illustrate the vehicle door activation device 200 of FIG. 1. Specifically, FIG. 2A illustrates a plan view of the vehicle door activation device 200 without an activation button 250. FIG. 2B illustrates a cross-sectional view of the vehicle door activation device 200 along the x-x' direction as shown in FIG. 2A. FIG. 2C illustrates a cross-sectional view of the vehicle door activation device 200 along the y-y' direction as shown in FIG. 2A.

The vehicle door activation device 200 serves as an interface for unlocking/locking the corresponding one of the doors 150 and authenticating a user for providing access to the vehicle cabin. In the illustrated example, the vehicle door activation device 200 includes a housing 210, a semiconductor chip 220, a back-up battery 230, one or more sensors 240, and an activation button 250.

The housing 210 includes the back-up battery 230 and the semiconductor chip 220. The housing 210 is mechanically connected with the activation button 250 such that the housing 210 and the activation button 250 form an enclosed chamber. The enclosed chamber is defined by a first chamber 212 and a second chamber 214. The first chamber 212 is chamber is positioned closer to the activation button 250 than the second chamber 214. The semiconductor chip 220 is disposed in the first chamber 212 and the back-up battery 230 is disposed in the second chamber 214. The interior surfaces of the housing 210 are encapsulated with liquid silicon rubber 216 (LSR). In some examples, one or more of the interior surfaces of the housing 210 may be encapsulated with LSR 216.

The semiconductor chip 220 includes a processor 221, memory 222, tactile switches 223, an antenna 224, communication ports 225, and power ports 226.

The processor 221 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs).

The memory 222 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 222 includes multiple kinds of memory, particularly volatile memory and non-volatile memory. The memory 222 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 222, the computer readable medium, and/or within the processor during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The antenna 224 supports a plurality of wireless communication protocol. For example the plurality of wireless communication protocol include BLE protocols, Wi-Fi®, LF communication, NFC, RFID, UWB communication, UHF communication, and/or any other wireless communication protocol.

The one or more communication ports 225 protrude the housing 210 for electrically connecting to, and establishing communication with, the e-latch 154, the body control module 110, the communication module 120 and/or other ECUs included in the vehicle. In some examples, the semiconductor chip 220 may wirelessly communicate with these devices via the antenna 224.

The one or more power ports 226 also protrude the housing 210 for receiving power from the vehicle battery 130 to supply the semiconductor chip 220.

The one or more sensors 240 are disposed in the enclosed chamber. The one or more sensors 240 include rain sensors. The rain sensors detect moisture or water within the enclosed chamber. In some examples, the one or more sensors 240 may include a temperature sensor for monitoring the temperature of the semiconductor chip 220 and/or the back-up battery 230. The vehicle door activation device 200 informs a user via the remote device and/or an infotainment system (not illustrated) of the vehicle 100 when the one or more sensors 240 detect a critical condition (e.g., detection of moisture, increase in temperature, etc).

The back-up battery 230 is electrically connected to the semiconductor chip 220. The back-up battery 230 is a rechargeable battery. For example, the back-up battery 230 may be a lithium ion rechargeable battery.

The activation button 250 includes an external surface 251 and an internal surface 252. The external surface 251 includes one or more light emitting diodes 253 (LED) electrically coupled to the semiconductor chip 220. The internal surface 252 includes one or more pillars 254 formed thereon. The internal surface 252 is also encapsulated with LSR 216. In some examples, one or more portions of the interior surface 252 of the housing 210 may be encapsulated with LSR 216. The activation button 250 is positioned with respect to the housing 210 such that: (1) the one or more pillars 254 are aligned with the one or more tactile switches 223; (2) the one or more pillars 254 are spaced apart from the one or more tactile switches 223; (3) when pressure is applied on the external surface 251, the one or more pillars 254 contacts at least one of the one or more tactile switches 223. In some examples, the activation button 250 may be formed of a semi-flexible material. In some examples, one or more springs (not illustrated) may be respectively positioned between the one or more pillars 254 and the one or more tactile switches 223.

The vehicle door activation device 200 is positioned with respect to the door 150 such that the external surface 251 share the same or substantially the same plane as the exterior of the door 150, and the housing 210 is positioned within the door 150.

Operations of the vehicle door activation device 200 will be describe in detail herein.

The vehicle door activation device 200 performs an authentication process for verifying whether a user is granted access to the vehicle. During the authentication process, the vehicle door activation device 200 communicates with a database stored in one or more ECUs of the vehicle and/or an external server to verify whether a remote device of the user is registered with the vehicle for passive entry. In some examples, the vehicle door activation device 200 directly establishes communication with the remote device to verify whether the remote is registered with the vehicle for passive entry. In some examples, the vehicle door activation device 200 performs the authentication process when a remote device is approaching the vehicle. If access granted to the approaching remote device, the one or more LEDs 253 are activated to display the current status of the door lock. For example, the one or more LEDs 253 may display a red illumination to indicate that the door is locked, and the one or more LEDs 253 may display a green illumination to indicate that the door is unlocked. In some examples, the one or more LEDs 253 may be displayed for a predetermined period.

The vehicle door activation device 200 further performs a vehicle door unlocking process. For example, when the activation button 250 is actuated once for less than 300 milliseconds, the vehicle door activation device 200: (1) performs the authentication process; (2) unlocks and causes the e-latch 154 to unlatch; (3) causes the one or more LEDs 253 to display the green illumination; and (4) causes the vehicle door 150 to automatically open up to a predetermined degree (e.g., via a vehicle door 150 plunger or a vehicle door 150 motor). If the vehicle door 150 is unlocked, and the activation button 250 is actuated, the vehicle door activation device 200: (1) causes the e-latch 154 to unlatch; (2) causes the one or more LEDs 253 to display the green illumination; and (3) causes the vehicle door 150 to automatically open up to the predetermined degree. In such example, the predetermine degree is less than a degree at which the vehicle door 150 is fully opened. In alternative examples, the vehicle door 150 is fully opened automatically.

The vehicle door activation device 200 further performs a vehicle door locking process. For example, when the vehicle door 150 is unlocked, and the activation button 250 is actuated twice with at least a 100 millisecond delay between the actuations, all of the doors 150 are centrally locked, and the one or more LEDs 253 on each of the doors 150 display the red illumination for the predetermined period. When the vehicle doors 150 are centrally locked, accesses from the exterior to the vehicle cabin are prevented.

In some examples, the vehicle door activation device 200 may further perform a vehicle door double locking process. For example, when the vehicle door 150 is unlocked and the activation button 250 is actuated for more than 400 milliseconds, the vehicle door activation device causes: (1) the vehicle door 150 to be double locked, i.e., an access from the exterior to the vehicle cabin is prevented and an access from the vehicle cabin to the exterior is further prevented; and (2) the one or more LEDs 253 on each of the doors 150 to display the red illumination for the predetermined period.

While a specific trigger is disclosed for each the vehicle door unlocking, locking, and double locking processes, any unique combination of number and duration of actuations of the activation button 250 may be used as a trigger for the vehicle door unlocking, locking, double locking processes. In some examples, a user may customize the trigger for each of the processes via the remote device and/or the infotainment system.

The vehicle door activation device 200 may operate in a normal mode or an emergency mode. During the normal mode, the vehicle door activation device 200 operates via power supplied by the vehicle battery 130. At this time, the back-up battery 230 is not used by the vehicle door activation device 200 and may be recharging via the power supplied though the vehicle battery 130. The vehicle door activation device 200 enters the emergency mode when the vehicle battery 130 is depleted or the power supplied by the vehicle battery 130 is lower than a threshold amount.

During the emergency mode, the vehicle door activation device 200 uses the back-up battery 230 to perform the authentication process, the vehicle door unlocking process, the vehicle door locking process, and the vehicle door double locking process. For example, during the emergency mode, the application of the back-up battery 230 may extend up to powering the e-latch 154, the semiconductor chip 220, the one or more LEDs 253, and/or one or more devices within the vehicle door 150 (e.g. vehicle door plunger, vehicle door 150 motor, vehicle window motor, etc). During the emergency mode, the vehicle door activation device 200 performs the authentication process by establishing communication with a passive tag previously registered with the vehicle (e.g., RFID/NFC passive tag). For example, the vehicle door activation device 200 may use the antenna 224 to detect the passive tag within a predetermined distance from the antenna (e.g., within 10 cm). When the passive tag is within the predetermined distance, the vehicle door activation device 200 compares the identification of the detected passive tag with one or more registered identification stored in the memory and/or other database within the vehicle or an external server. Based on the comparison, the vehicle door activation device 200 grants access to the vehicle cabin. In some examples, the vehicle door activation device 200 may use an active tag and/or the remote device for the authentication process.

In some examples, the vehicle door activation device 200 further includes a security system for alerting the user in response to a detection of tampering. The security system includes the semiconductor chip 220 and one or more electrical nodes. The one or more electrical nodes are embodied by the electrical connections between the one or more LEDs 253 and the semiconductor chip 220, between the semiconductor chip 220 and the communication port 225 and/or the power port 226, and/or between the back-up battery 230 and the semiconductor chip 220. In some examples, the one or more electrical nodes may be separate entities that electrically connect: (1) the housing 210 and the activation button 250; (2) the housing 210 and the back-up battery 230; and/or (3) the housing 210 and other components within the vehicle door 150. The semiconductor chip 220 monitors the voltage level of each of the one or more electrical nodes. When the semiconductor chip 220 detects an absence of voltage at the one or more electrical nodes or detects that a voltage level at the one more electrical nodes is below a threshold value, the semiconductor chip 220 determines that the vehicle door activation device 200 has been tampered. In response, the vehicle door activation device 200 may: (1) alert a user via the remote device; (2) short the semiconductor chip 220; (3) deplete the back-up battery 230; (4) issue a command to the e-latch 154 to lock (or double lock) the vehicle door 150; and/or automatically contact a law enforcement agency.

Figure 3:
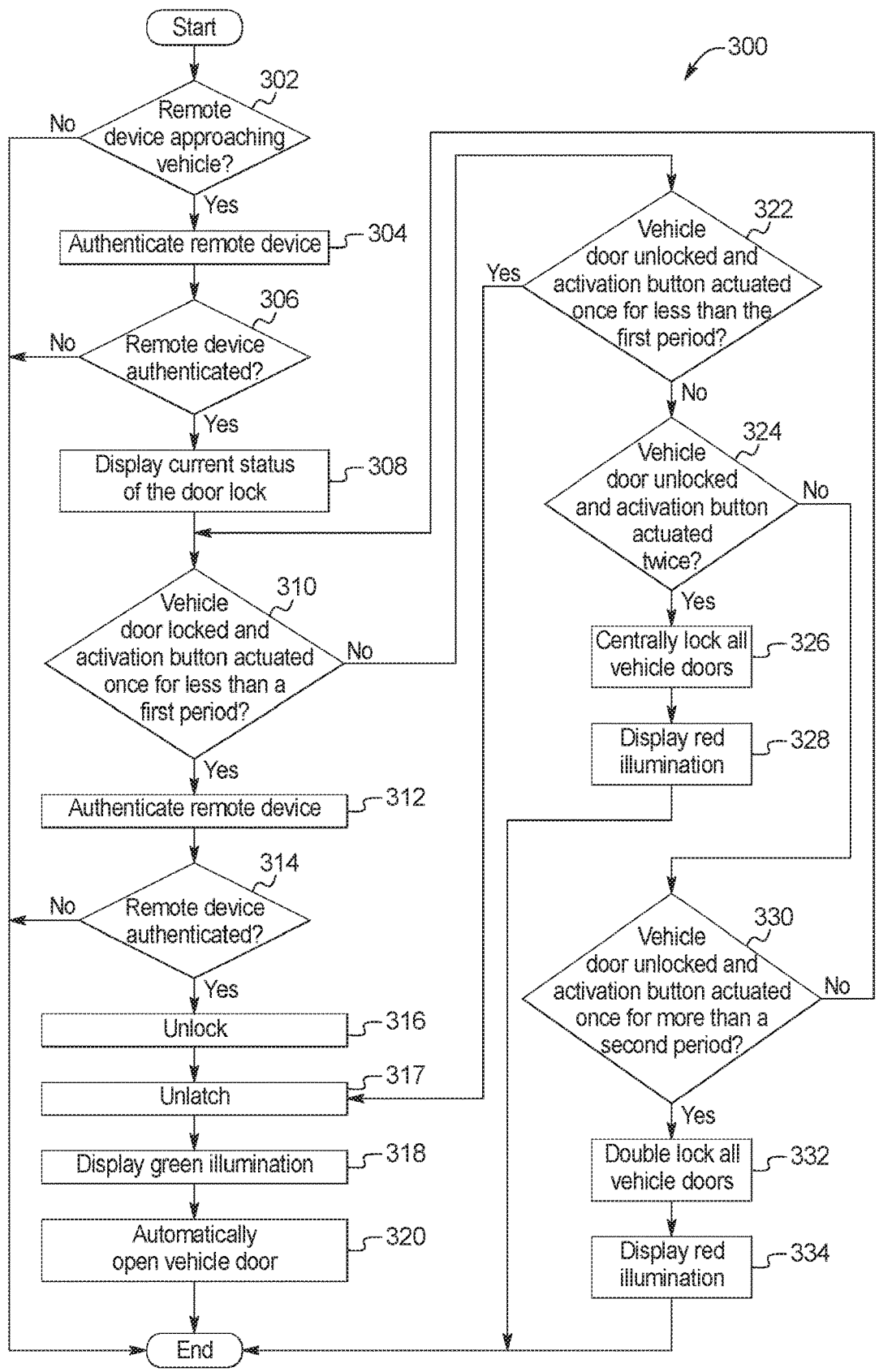
FIG. 3. is a flowchart of a method for operating the vehicle door activation device of the vehicle of FIG. 1.

FIG. 3 is a flowchart of a method 300 for operating the vehicle door activation device 200 of FIG. 2.

At block 302, the vehicle door activation device 200 uses the antenna 224 and/or the communication module 120 to determine whether a remote device is approaching the vehicle. If a remote device is approaching the vehicle, the method 300 continues to block 304. If there is no remote devices approaching the vehicle, the method 300 terminates.

At block 304, the vehicle door activation device 200 performs the authentication process.

At block 306, the vehicle door activation device 200 determines whether the remote device is authenticated. If the vehicle remote device is authenticated, the method 300 continues to block 308. If the vehicle remote device is not authenticated, the method 300 terminates.

At block 308, the vehicle door activation device 200 causes the one or more LEDs 253 to display the current status of the door lock. For example, the one or more LEDs 253 may display a red illumination to indicate that the door is locked, and the one or more LEDs 253 may display a green illumination to indicate that the door is unlocked. In some examples, the one or more LEDs 253 may be displayed for a predetermined period.

At block 310, the vehicle door activation device 200 determines whether the vehicle door 150 is currently locked and the activation button 250 is actuated once by a user for less than a first period. For example, the first period may be 300 millisecond. If the vehicle door 150 is locked and the activation button 250 is actuated once by a user for less than the first period, the method 300 continues to block 312. Otherwise, the method 300 continues to block 322.

At block 312, the vehicle door activation device 200 performs the authentication process.

A block 314, the vehicle door activation device 200 determines whether the remote device is authenticated. If the vehicle remote device is authenticated, the method 300 continues to block 316. If the vehicle remote device is not authenticated, the method 300 terminates.

At block 316, the vehicle door activation device 200 unlocks the vehicle door 150.

At block 317, the vehicle door activation device 200 causes the e-latch 154 to unlatch.

At block 318, the vehicle door activation device 200 causes the one or more LEDs 253 to display the green illumination.

At block 320, the vehicle door activation device 200 causes the vehicle door 150 to open automatically up to the predetermined degree. In some examples, the vehicle door 150 is fully opened automatically.

At block 322, the vehicle door activation device 200 determines whether the vehicle door 150 is unlocked and the activation button 250 is actuated once for less than the first period. If the vehicle door 150 is unlocked and the activation button 250 is actuated once for less than the first period, the method 300 continues to block 317. Otherwise, the method 300 continues to block 324.

At block 324, the vehicle door activation device 200 determines whether the vehicle door 150 is unlocked and the vehicle door activation button 250 is actuated twice with at least a 100 millisecond delay between the actuations. If the vehicle door 150 is unlocked and the vehicle door 150 activation button 250 is actuated twice with at least a 100 millisecond delay between the actuations, the method 300 continues to block 326. Otherwise, the method 300 continues to block 330.

At block 326, the vehicle door activation device 200 centrally locks all of the vehicle doors 150.

At block 328, the vehicle door activation device 200 causes the one or more LEDs 253 on each of the vehicle doors 150 to display the red illumination.

At block 330, the vehicle door activation device 200 determines whether the vehicle door 150 is unlocked and the vehicle door 150 activation button 250 is actuated once for more than a second period. For example, the second period may be 400 milliseconds. If the vehicle door 150 is unlocked and the vehicle door 150 activation button 250 is actuated once for more than the second period, the method 300 continues to block 332. Otherwise, the method 300 returns to block 310.

At block 332, the vehicle door activation device 200 double locks all of the vehicle doors 150.

At block 334, the vehicle door activation device 200 causes the one or more LEDs 253 one each of the vehicle doors 150 to display the red illumination.

Although the example flowchart illustrated in FIG. 3 includes a starting point and an ending point, in some examples, the flowchart may repeat at the starting point. Further, although a specific method for operating the vehicle activation door device 200 is described with reference to the flowchart illustrated in FIG. 3, many other methods may alternatively be used. For example, the order of execution of the blocks may be changed, and/or some of the blocks described may be changed, eliminated, or combined.

Figure 4:
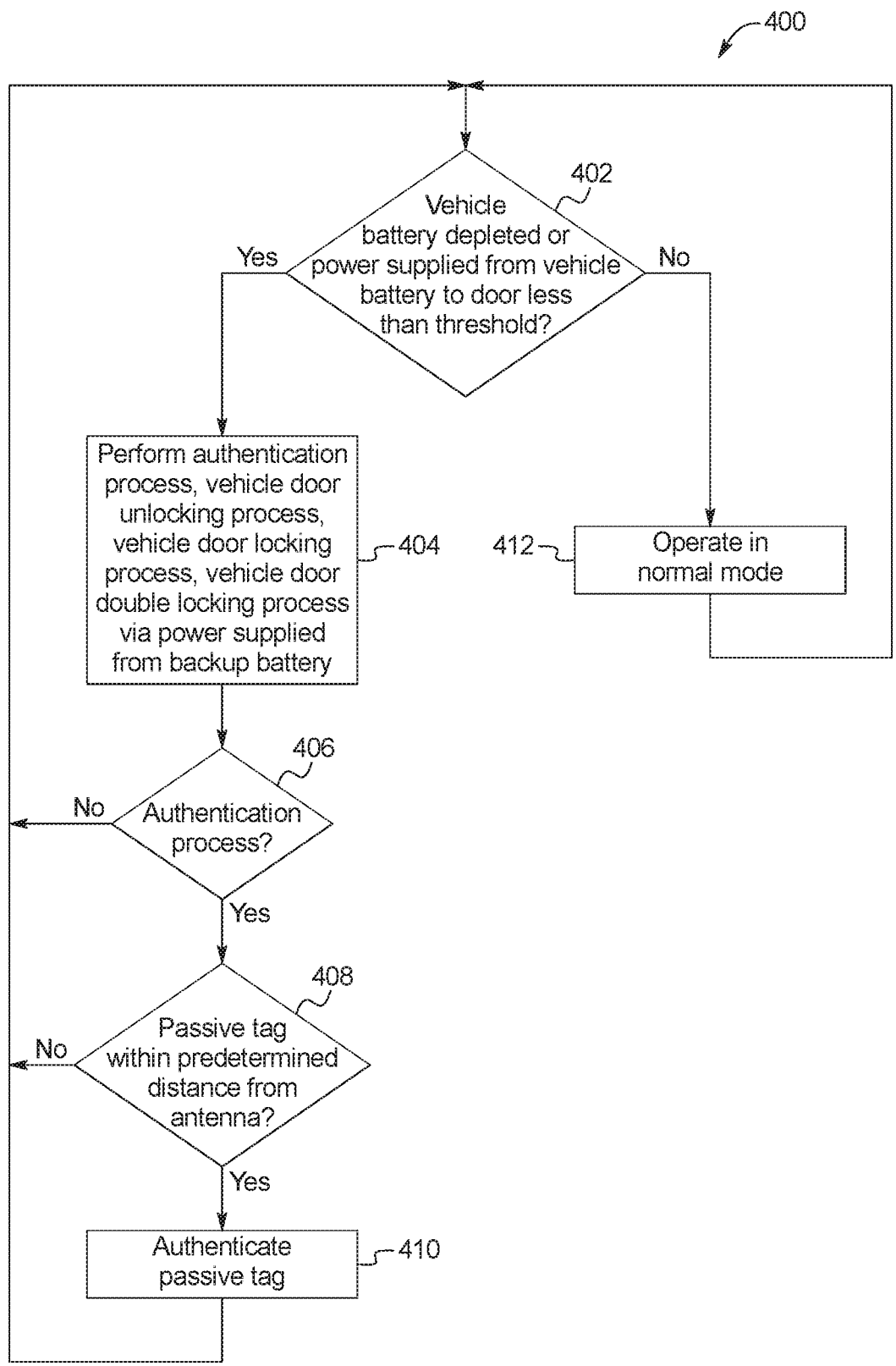
FIG. 4. is a flowchart of a method for triggering an emergency mode of the vehicle door activation device of the vehicle of FIG. 1.

FIG. 4. is a flowchart of a method 400 for triggering the emergency mode of the vehicle door activation device 200.

At block 402, the vehicle door activation device 200 determines whether the vehicle battery 130 is depleted or a power supplied from the vehicle battery 130 to a vehicle door 150 is less than a threshold value. If so, the method 400 continues to block 404. Otherwise, the method 400 continues to block 412.

At block 404, the vehicle door activation device 200 enters the emergency mode. During the emergency mode, the vehicle door activation device 200 performs the authentication process, the vehicle door unlocking process, the vehicle door locking process, or the vehicle door double locking process via power supplied from the back-up battery 230.

At block 406, the vehicle door activation device 200 determines whether the authentication process is being performed. If so, the method 400 continues to block 408. Otherwise, the method 400 returns to block 402.

At block 408, the vehicle door activation device 200 determine whether a passive tag is within a predetermined distance from the antenna 224 (e.g., 10 cm). If so, the method 400 continues to block 410. Otherwise, the method 400 returns to block 402.

At block 410, the vehicle door activation device 200 authenticates the passive tag.

At block 412, the vehicle door activation device 200 operates in the normal mode.

Although a specific method for triggering the emergency mode of the vehicle door activation device 200 is described with reference to the flowchart illustrated in FIG. 4, many other methods may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a vehicle door comprising:
      a switch;
      a back-up battery;
      antennas;
      one or more processors configured to:
         responsive to a voltage supplied to the vehicle door being less than a threshold:
         cause the back-up battery to supply power to the vehicle door; and
         responsive to a tag being within a proximity from the antennas and an actuation of the switch, cause the vehicle door to unlock.

2. The vehicle of claim 1, wherein the one or more processors are further configured to: responsive to the switch being actuated once for less than a first period:

unlock the vehicle door; and automatically open the vehicle door up to a predetermined degree.

3. The vehicle of claim 1, further comprising: a plurality of vehicle doors including the vehicle door, wherein the one or more processors are further configured to: responsive to the switch being actuated twice, lock the plurality of vehicle doors.

4. The vehicle of claim 1, wherein the vehicle door further comprises one or more light emitting diodes (LED), wherein the one or more processors are further configured to:

responsive to the vehicle door being unlocked, cause the one or more LEDs to display a first illumination; and responsive to the vehicle door being locked, cause the one or more LEDs to display a second illumination.

5. The vehicle of claim 1, wherein the tag one of a group consisting: a passive near field communication (NFC) tag, a passive radio-frequency identification (RFID) tag, an active NFC tag, and an active RFID tag.

6. The vehicle of claim 1, wherein the vehicle door further comprises one or more display devices, wherein the one or more processors are further configured to:

responsive to a remote device approaching the vehicle, authenticate the remote device; and responsive to the authentication, cause the one or more display devices to display an illumination corresponding to a status of a door lock of the vehicle door.

7. The vehicle of claim 1, further comprising a vehicle battery, wherein the one or more processors are further configured to responsive to the vehicle battery being depleted, cause the back-up battery to supply power to the vehicle door.

8. A vehicle door activation device comprising:

a housing;

an activation button connected with the housing to define a first chamber and a second chamber;

a back-up battery stored in the first chamber; and a semiconductor chip stored in the second chamber, the semiconductor chip configured to:

responsive to a voltage supplied to a vehicle door being less than a threshold:

cause the back-up battery to supply power to the vehicle door; and responsive to a tag being within a proximity from the semiconductor chip and an actuation of the activation button, cause the vehicle door to unlock.

9. The vehicle door activation device of claim 8, further comprising at least one rain sensor.

10. The vehicle door activation device of claim 8, further comprising at least one temperature sensor.

11. The vehicle door activation device of claim 8, further comprising at least one electrical node connecting the housing and the activation button, the at least one electrical node electrically coupled to the semiconductor chip, wherein the semiconductor chip is further configured to: responsive to detecting an absence of voltage at the at least one electrical node, deplete the back-up battery.

12. The vehicle door activation device of claim 8, the semiconductor chip comprising:

at least one memory;

at least one antenna;

at least one tactile switch;

at least one processor configured to:

responsive to an actuation of the at least one tactile switch, cause the vehicle door to unlock.

13. The vehicle door activation device of claim 12, the activation button comprising:

a first surface facing away from the first chamber and the second chamber; and a second surface opposing the first surface, wherein the second surface includes one or more pillars, wherein the one or more pillars are aligned with the one or more tactile switches.

14. The vehicle door activation device of claim 13, wherein the one or more pillars are spaced apart from the one or more tactile switches.

15. The vehicle door activation device of claim 8, wherein one or more surfaces of the activation button and the housing facing the first chamber and the second chamber are encapsulated with liquid silicon rubber.

16. A method comprising:

responsive to a voltage supplied to a vehicle door being less than a threshold:

causing a back-up battery within the vehicle door to supply power to the vehicle door; and responsive to a tag being within a proximity from antennas included in the vehicle door and an actuation of a switch included in the vehicle door, causing the vehicle door to unlock.

17. The method of claim 16, further comprising: responsive to the switch being actuated once for less than a first period:

unlocking the vehicle door; and automatically opening the vehicle door up to a predetermined degree.

18. The method of claim 16, further comprising:

responsive to the vehicle door being unlocked, causing one or more LEDs included in the vehicle door to display a first illumination; and responsive to the vehicle door being locked, causing the one or more LEDs to display a second illumination.

19. The method of claim 16, wherein the tag one of a group consisting: a passive near field communication (NFC) tag, a passive radio-frequency identification (RFID) tag, an active NFC tag, and an active RFID tag.

20. The method of claim 16, further comprising:

responsive to a remote device approaching the vehicle, authenticating the remote device; and responsive to the authentication, causing one or more display devices within the vehicle door to display an illumination corresponding to a status of a door lock of the vehicle door.

* * * * *